Nov. 27, 1928.
C. A. KOPP
1,693,301
SHEARS
Filed July 16, 1926
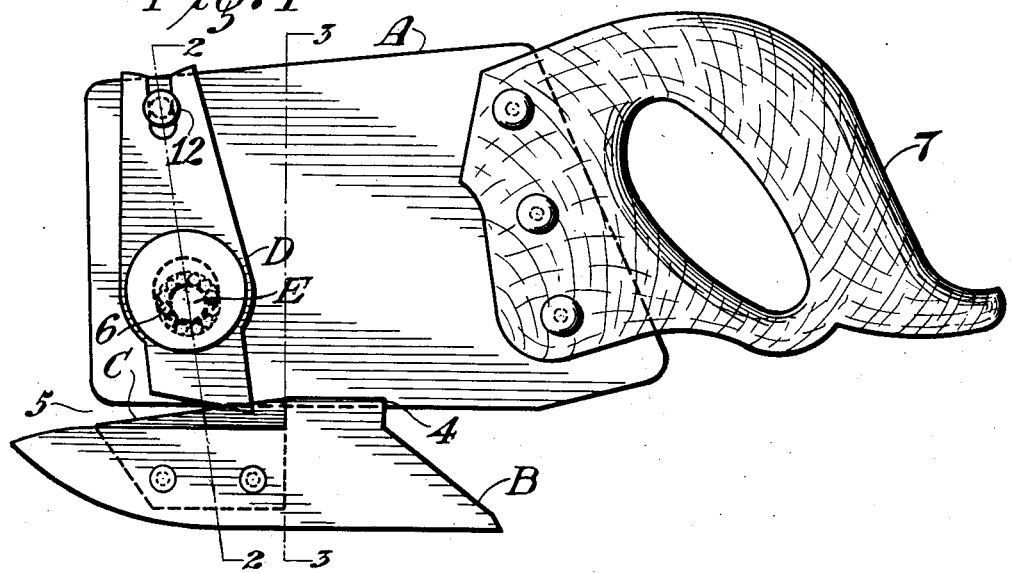
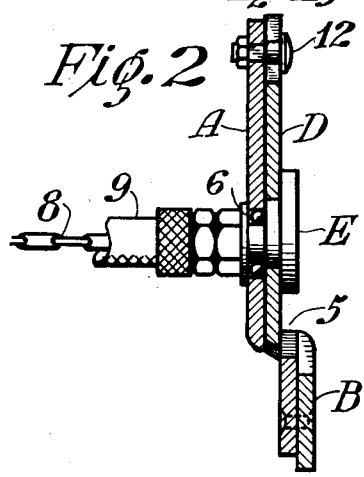 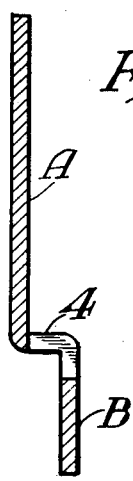 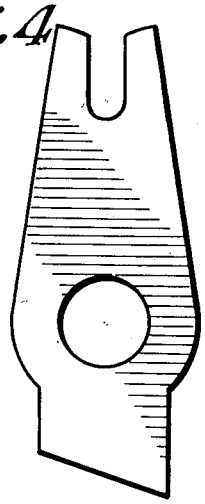
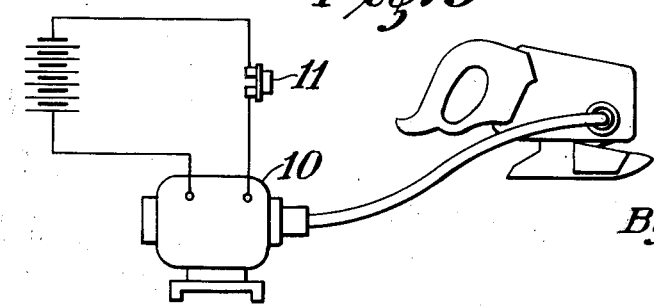
Inventor
Carl Andrew Kopp
By
Adam E. Fisher
Attorney.

Patented Nov. 27, 1928.

1,693,301

UNITED STATES PATENT OFFICE.

CARL ANDREW KOPP, OF SIOUX CITY, IOWA.

SHEARS.

Application filed July 16, 1926. Serial No. 122,863.

My invention relates to portable, mechanically operated sheet metal shears, and has for one object the provision of such a device that will be readily portable when in use.

Another object is to provide, in a device of the character described, means whereby intricate patterns may be cut from metal plates without requiring the shifting of said plates while being cut.

Another object is to provide, in a device of the character described, means whereby said shears may be operated by mechanical power.

With the above and other objects in view, the invention consists of the combination and arrangement of parts and in the details of construction hereinafter described and claimed, it being understood that within the scope of what is claimed, changes in the precise embodiment of the invention shown can be made, without departing from the spirit of the invention.

In the drawings—

Figure 1 is a side elevation of my invention;

Figure 2 is a section along the line 2—2 of Figure 1;

Figure 3 is a section along the line 3—3 of Figure 1;

Figure 4 is a detail of the cutting blade;

Figure 5 is a diagrammatic view illustrating the invention including the motor and motor control.

Referring now more particularly to the drawings, A refers to the vertically disposed frame of the shears of relatively narrow cross section, which in the preferred form as shown in the drawings, comprises a metal plate of approximately rectangular shape and having a depending and laterally offset shoe B formed integrally with the said frame and connected thereto by the bridge 4, said bridge having provided therein the longitudinally extending throat 5 wherein are positioned the opposing cutting members of the shears comprising the upwardly inclined stationary blade C attached to the shoe B, and the vertically reciprocating cutting blade D eccentrically journaled on the shaft E, said shaft being journaled in the ball bearing 6 mounted in the frame A. The wooden handle 7 is positioned on the said frame A oppositely from the throat 5.

Rotary motion is imparted to the shaft E by the flexible shaft 8 contained in the flexible tube 9; said flexible shaft 8 may be operated in any suitable manner, such as by an electric motor 10 controlled and regulated by an electric switch 11, or any other suitable control may be employed. An anti-clockwise rotary motion of said shaft E will cause the cutting blade D to take the motion of a sliding block linkage by reason of the pin 12 positioned vertically above the said shaft E and slidably engaging the said cutting blade D; whereby the motion communicated to the cutting blade D is of a nature such that the edge of the said cutting blade will follow a circular path, thus causing the said cutting blade to move vertically with relation to the shoe B and stationary blade C, and at the same time to move backward and forward with relation to the frame A, so that when cutting the metal the action of the blade is downwardly and rearwardly, thus giving a slicing action to the blade, whereby the cutting of the metal is rendered easier, and at the same time the shear is more easily guided on its course.

In describing my invention, I have shown a preferred form thereof, constructed of sheet metal and wood, but it is obvious that other suitable materials may be used, such as steel castings or a combination of sheet metal and castings according to the option of the person constructing the device.

In the use of my invention, the sheet metal to be cut is inserted in the throat 5, thereby being subjected to the action of the oscillating cutting blade D in conjunction with the stationary blade C, so as to cause one cut edge to pass downwardly and under the oscillating blade D and frame A, and the other edge to ride on the upwardly inclined blade C so as to pass over the said bridge 4, so that it is obvious that the direction of feed of the device may be readily altered while in operation, thereby facilitating the cutting of intricate shapes from metal sheets, also the device may be readily transported or moved about while in operation, thus facilitating the cutting operation without moving the sheet to be cut.

I claim:

1. In a portable power driven cutting tool, a saw frame, a handle at one end of the frame, said frame provided with an offset shoe at its lower edge, said shoe being formed with an inwardly extending throat, a stationary blade secured to the shoe so that its cutting edge will project obliquely above the top edge of the shoe, and within the throat, an elongated cutting member mounted for vertical movement at its intermediate portion to the frame, guide means at the upper end of said member, the lower end of said member being diagonal and beveled, and further adapted for complementary cutting action with the stationary blade.

2. In a portable power driven cutting tool, a saw frame, a handle at one end of the frame, a laterally offset depending shoe formed integrally of the frame material, the shoulder formed by the offset shoe having an inwardly extending throat, a stationary blade secured to the tool so that its cutting edge will project obliquely above the top edge of the shoe and within the throat, an elongated cutting member mounted for vertical movement at its intermediate portion to the frame, guide means at the upper end of said member, the lower end of said member being diagonal and beveled, and further adapted for complementary cutting action with the stationary blade.

In testimony whereof I affix my signature.

CARL ANDREW KOPP.